US006493472B1

United States Patent
Takagi et al.

(10) Patent No.: US 6,493,472 B1
(45) Date of Patent: Dec. 10, 2002

(54) SHEET PROCESSING APPARATUS, SHEET PROCESSING METHOD AND INFORMATION PROCESSING APPARATUS

(75) Inventors: Shiro Takagi, Tokyo (JP); Takeshi Ogaki, Tokyo (JP); Yoshiko Takeda, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/285,734

(22) Filed: Apr. 5, 1999

Related U.S. Application Data

(63) Continuation of application No. 08/710,771, filed on Sep. 20, 1996, now Pat. No. 6,052,207.

(30) Foreign Application Priority Data

Nov. 27, 1995 (JP) .............................................. 7-307590

(51) Int. Cl.[7] ................................................. G06K 9/20
(52) U.S. Cl. ........................ 382/317; 382/296; 382/298
(58) Field of Search ............................... 382/294, 306, 382/309, 317; 358/450; 345/433

(56) References Cited

U.S. PATENT DOCUMENTS

| | | | | |
|---|---|---|---|---|
| 5,508,810 A | * | 4/1996 | Sato | 382/294 |
| 5,530,560 A | * | 6/1996 | Nakajima | 358/453 |
| 5,611,000 A | * | 3/1997 | Szeliski et al. | 382/294 |
| 5,987,191 A | * | 11/1999 | Suzuki | 382/289 |
| 6,266,452 B1 | * | 7/2001 | McGuire | 382/294 |

FOREIGN PATENT DOCUMENTS

| | | |
|---|---|---|
| DE | 41 10 100 A1 | 10/1992 |
| EP | 0 581 317 A2 | 2/1994 |
| JP | 6-284144 | 10/1994 |
| WO | WO 95/34046 | 12/1995 |

OTHER PUBLICATIONS

Patent Abstracts of Japan, Takaya, vol. 18, No. 232, 1994—06-020095.

* cited by examiner

Primary Examiner—Yon J. Couso
(74) Attorney, Agent, or Firm—Foley & Lardner

(57) ABSTRACT

CPU of a sheet processing apparatus reads a sheet by a scanner, stores the image of the sheet in an image memory, checks to determine whether expanding, reducing, rotating, synthesizing or other editing operations have been performed for the sheet image stored in the image memory and performs processing for converting the image to a recognizable size and rotating an image before recognizing the read sheet image when determining that editing has been performed. CPU further recognizes sheet ID information contained in the sheet image stored in the image memory by means of a character recognizing section, selects an unrecorded sheet image corresponding to the sheet ID information from a hard disk, stores the image in the image memory and prints out by way of a printer. Thus, sheets synthesized, expanded/reduced, rotated or edited in other ways can be recognized and high image quality of clean and unrecorded sheets can always be provided, thereby maintaining a good recognition rate.

11 Claims, 15 Drawing Sheets

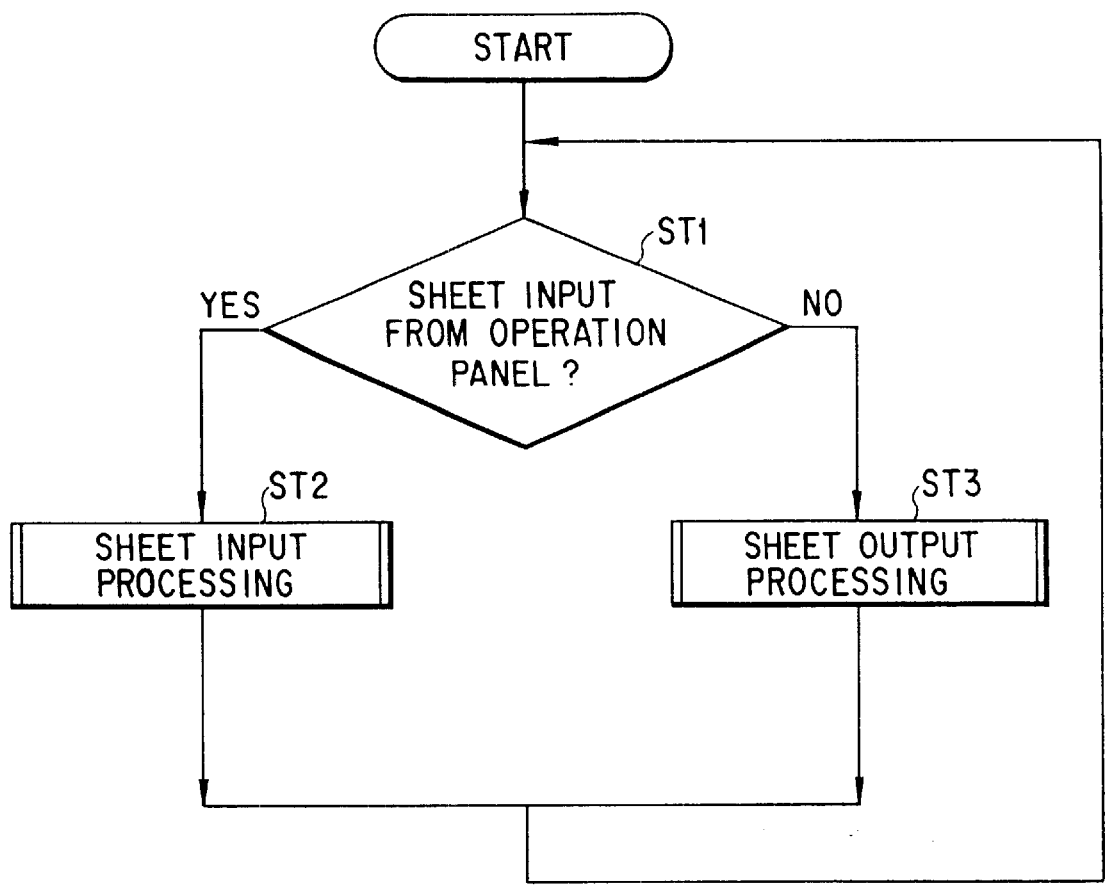
F I G. 6

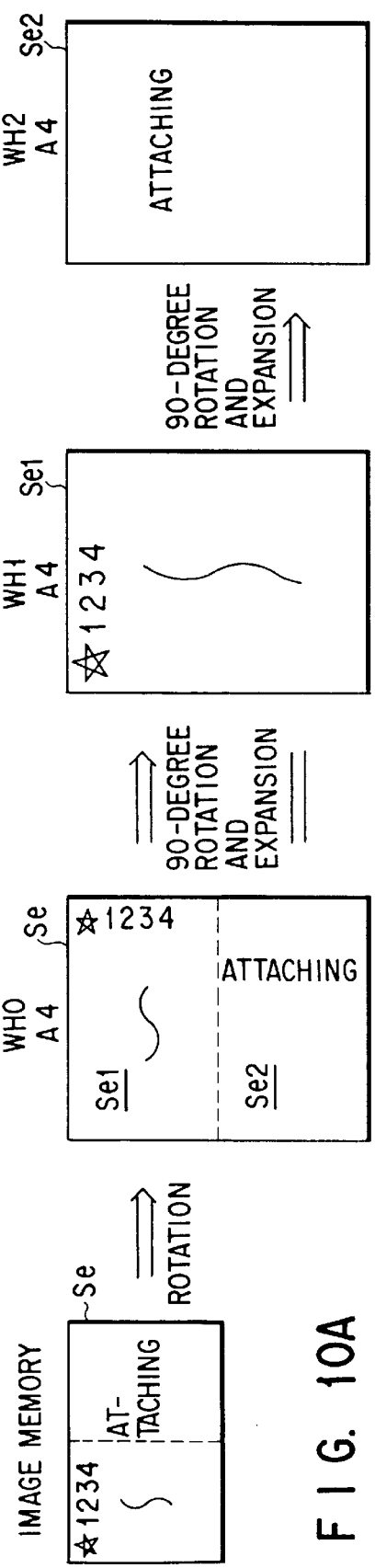
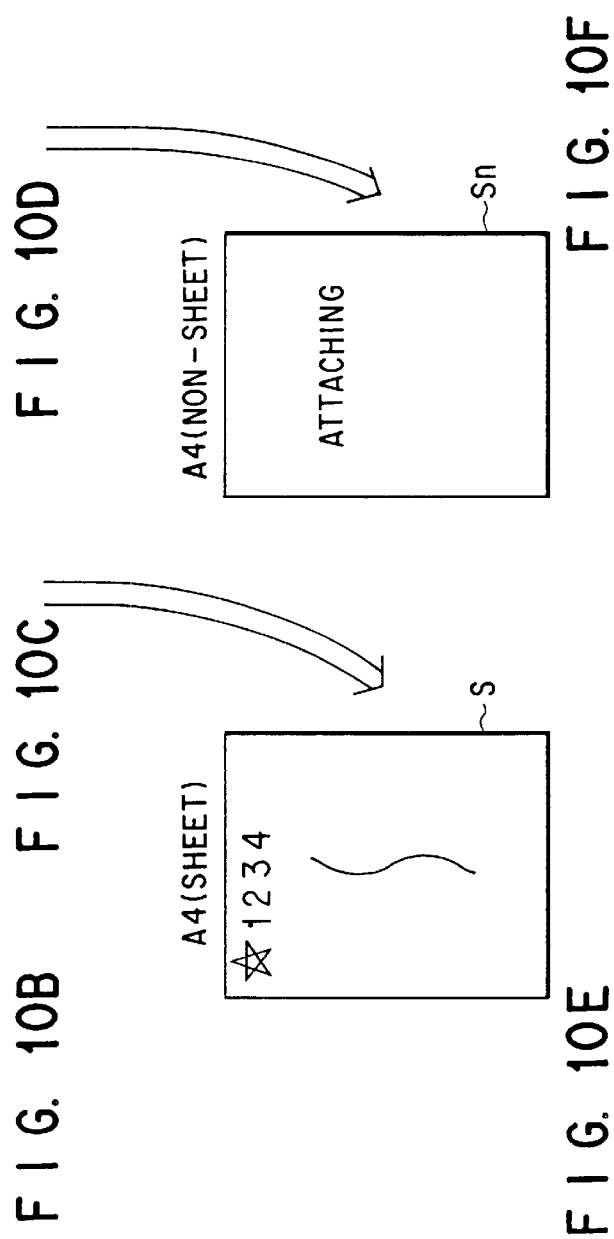

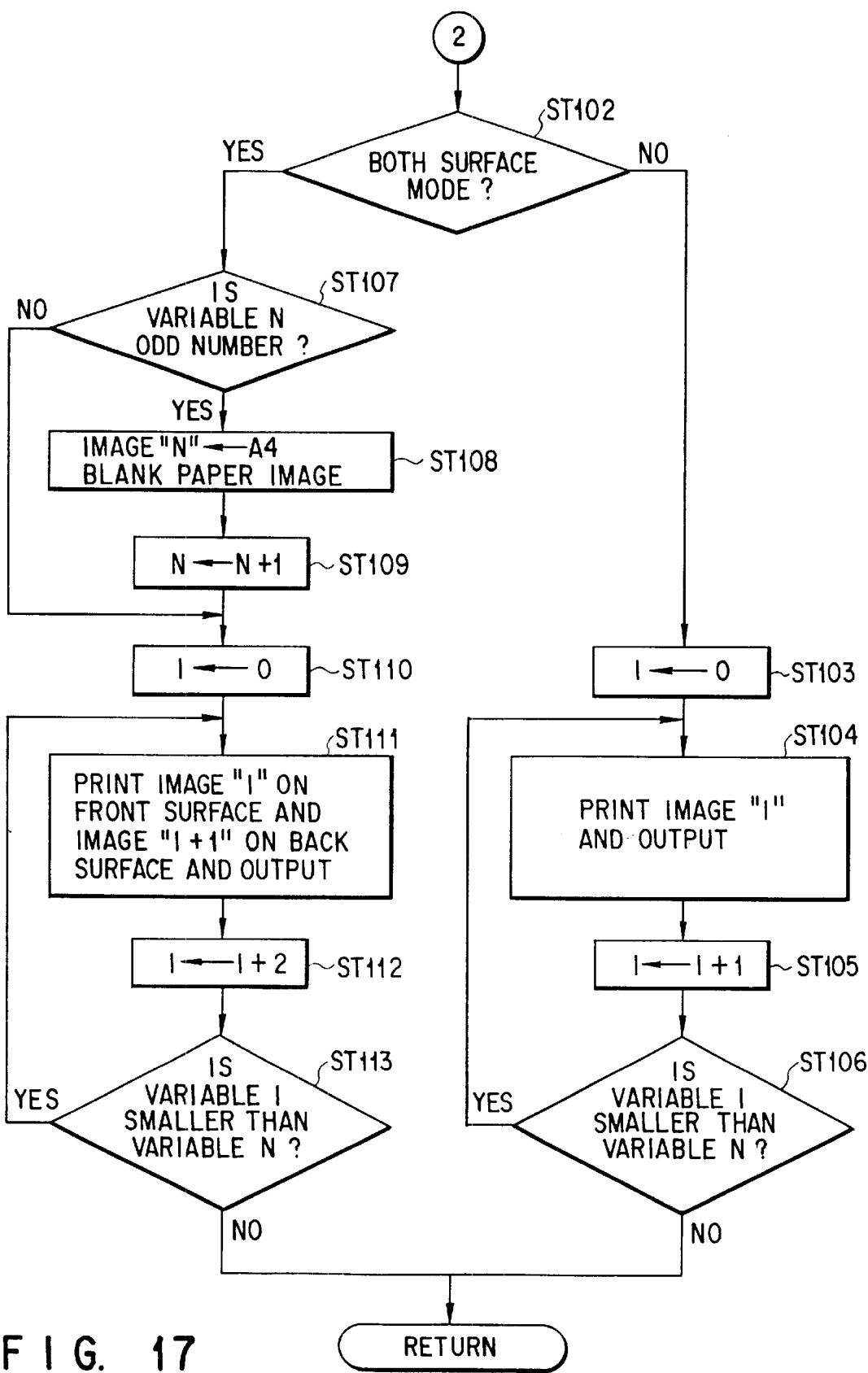
F I G. 17

SHEET PROCESSING APPARATUS, SHEET PROCESSING METHOD AND INFORMATION PROCESSING APPARATUS

This application is a continuation, of application Ser. No. 08/710,771, filed Sep. 20, 1996. U.S. Pat. No. 6,052,207.

BACKGROUND OF THE INVENTION

1. Field of the Invention

The present invention relates to sheet processing apparatus and method for recognizing OMR (Optical Mark Recognition) sheets having fixed formats and an information processing apparatus.

2. Description of the Related Art

Conventionally, there has been available an information processing apparatus capable of transmitting data to a specified circulation place by inputting a document circulation sheet provided with data, as disclosed in Japanese Unexamined Patent Publication No. 06-284144. In this document circulation sheet, there is an area for specifying a circulation destination and the sheet processing apparatus in the information processing apparatus recognizes information on circulation destinations handwritten in this area by an operator and determines a place to which data is to be sent.

Processing of an image recorded in the sheet by recognizing the same in such a manner enables the operator to perform an operation very easily only by handwriting a content to be processed in the sheet and inputting this to the sheet processing apparatus without needing to perform other complex operations with an operation panel on the sheet processing apparatus. The sheet can also be input via facsimile equipment and thus this may be applied to various fields.

However, it has been impossible to use sheets edited, for instance by synthesizing or reducing two sheets in one for saving paper or conversely expanding sheets so as to enable inputting of large characters. This was mainly due to the assumption that an area to be recognized in the sheet was in a fixed position when the sheet should be recognized.

In the case of unrecorded sheets with nothing handwritten therein, data would be made by copying this using a copying machine. However, repeated copying of this brought about reduction in the sheet quality and lowering of a recognition rate. When there were no unrecorded sheets any more, it was necessary for the operator to erase the handwritten portions by an eraser or correction liquid.

Therefore, for the conventional information processing apparatus, a problem lies in the fact that it is impossible to use sheets edited, for instance by synthesizing or reducing two sheets in one for saving paper or conversely expanding sheets so as to enable inputting of large characters.

Another problems lies in the fact that in the case of unrecorded sheets with nothing handwritten therein, though data is made by copying this using a copying machine, repeated copying reduces the quality of the sheets and lowers a recognition rate.

SUMMARY OF THE INVENTION

It is a primary object of the invention to provide a sheet processing apparatus, a sheet processing method and an information processing apparatus capable of processing sheets even having fixed formats and edited, for instance by means of synthesizing, expanding/reducing or rotating.

It is a secondary object of the invention to provide a sheet processing apparatus, a sheet processing method and an information processing apparatus capable of always providing clean unrecorded sheets with high image quality and preventing lowering of a recognition rate.

In accordance with an aspect of the invention, a sheet processing apparatus includes inputting means for inputting image data of an original having a fixed format; storing means for storing the image data of the original input by the inputting means; detecting means for detecting that the format of the original image is edited; converting means for converting an edited format of the original image stored by the storing means to the fixed format when the detecting means detects that the format of the original image is edited; and recognizing means for recognizing information contained in the original image with its format converted by the converting means.

In accordance with another aspect of the invention, an information processing apparatus includes inputting means for inputting image information; recognizing means for recognizing a condition on character information contained in the image information and recognizing the character information according to the condition; converting means for converting the image information inputted by the inputting means into image information satisfying the condition before the recognizing means recognizes the character information; discriminating means for discriminating format information of the image information converted by the converting means; and supplying means for supplying the image information converted by the converting means to the recognizing means with the format information.

In accordance with still another aspect of the invention, an information processing apparatus includes recognizing means for recognizing character information contained in image information having a predetermined format; first converting means for converting the image information into image information having a size recognizable by the recognizing means; second converting means for converting the image information, converted by the first converting means, into image information having the direction recognizable by the recognizing means; first discriminating means for discriminating a format of the image information according to the image information converted by the first converting means; second discriminating means for discriminating a format of the image information according to the image information converted by the second converting means when the format of the image information is not discriminated by the first discriminating means; and means for supplying the image information to the recognizing means when one of the first and second discriminating means discriminates that the format of the image information corresponds to the predetermined format.

In accordance with yet another aspect of the invention, an information processing apparatus for processing image information based on a specified information processing condition, comprising: inputting means for inputting image information; recognizing means for recognizing character information from the image information inputted by the inputting means based on a predetermined recognizing condition; converting means for converting the image information inputted by the inputting means into an image information satisfying the predetermined recognizing condition of the recognizing means; supplying means for supplying the converted image information to the recognizing means; and processing means for processing the image information inputted by the inputting means based on the character information recognized from the image information supplied by the supplying means by the recognizing means.

In accordance with a further aspect of the invention, a sheet processing apparatus including input means for inputting a sheet image of a sheet original; storing means for storing the sheet image input by the inputting means; sheet correcting and separating means for converting, when a sheet image is an edited image, the sheet image stored by the storing means to an original state before editing; recognizing means for recognizing a character of the sheet image converted to the original state before editing by the sheet correcting and separating means or that of a nonedited sheet image stored in the storing means; and processing means for performing processing according to a recognized result of the recognizing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 6 is a flow chart showing a main processing procedure in a sheet processing apparatus;

FIGS. 10A to 10F are views each showing an example of sheet separation and correction in a sheet processing apparatus;

FIG. 17 is a flow chart showing sheet printing.

DETAILED DESCRIPTION OF THE PREFERRED EMBODIMENT

An embodiment of the invention will now be described with reference to the accompanying drawings.

Figure 1A:
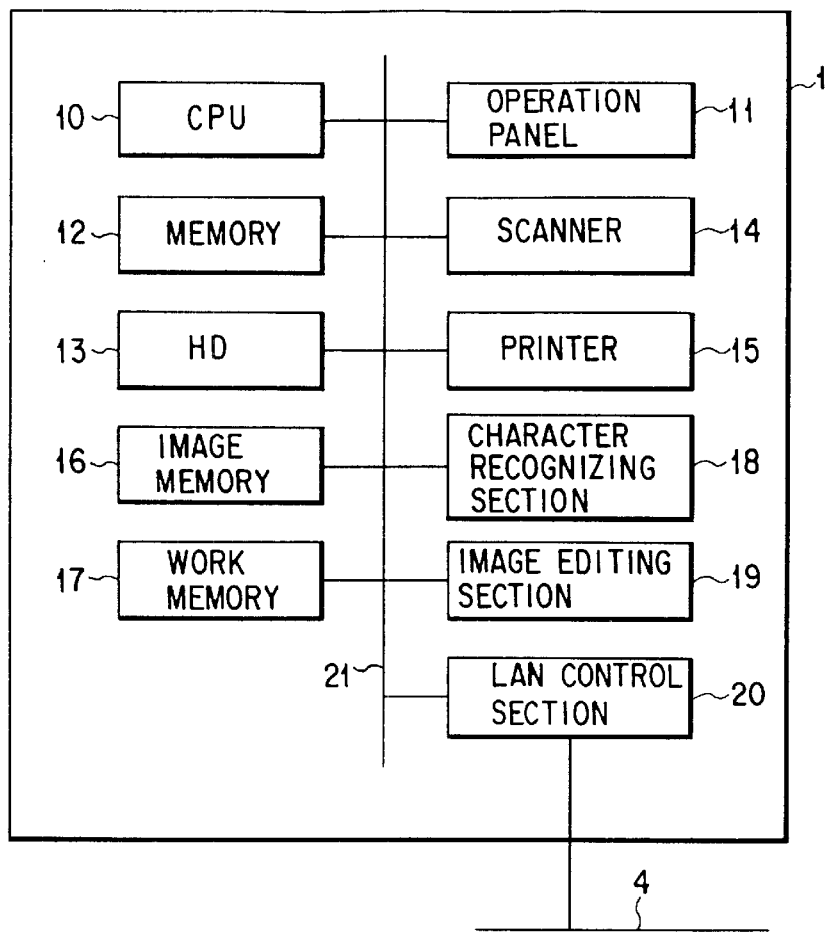
FIG. 1A is a block diagram showing in outline the structure of a sheet processing apparatus provided by the invention.

FIG. 1A is a block diagram showing in outline the structure of a sheet processing apparatus 1 as an information processing apparatus of the invention.

The sheet processing apparatus 1 is constructed by CPU 10 for controlling the whole apparatus, an operation panel 11 constituted of a keyboard section and a display section, a memory 12 including ROM or RAM as storing means for storing programs and data to be executed by CPU 10, a hard disk (HD) 13 as storing means for storing programs and various data, a scanner 14 equipped with an automatic document feeder (ADF) for reading originals as inputting means, a printer 15 as printing means for printing images, an image memory 16 for storing images read from the scanner 14, a work memory 17 for storing images used for operations, a character recognizing section 18 as recognizing means for recognizing characters in images an image editing section 19 as editing means for expanding, reducing, rotating, separating or synthesizing images, a line connection control section 20 for connecting with a communication line 4 of LAN, etc. and a system bus 21 for connecting the above-noted elements together.

Figure 1B:
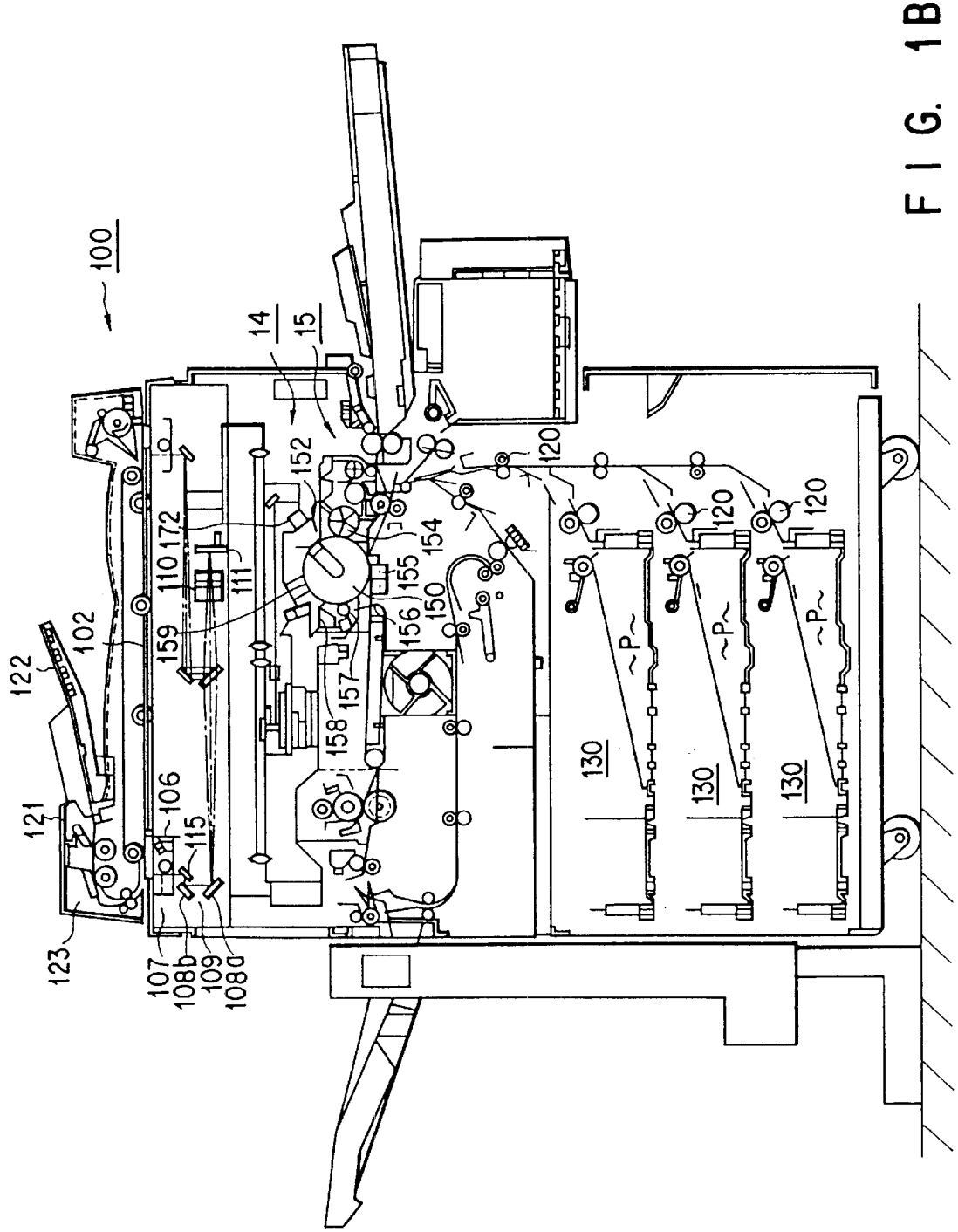
FIG. 1B is a view showing in outline the structure of the sheet processing apparatus shown in FIG. 1.

FIG. 1B illustrates in outline the structure of the sheet processing apparatus having the block configuration shown in FIG. 1A. This sheet processing apparatus 1 is provided with the scanner 14 in the upper portion of a housing and the printer 15 in the lower portion thereof. An automatic document feeder (ADF) 100 is provided on the scanner 14.

The automatic document feeder 100 is constructed in such a manner that the rear edge portion of a cover main body 121 is attached to the upper surface edge of the apparatus main body via a hinge apparatus, not shown, so as to be freely opened and closed and an original platen 102 may be opened by rotating and displacing the automatic document feeder when necessary.

An original feeding platen 122 capable of collectively holding a plurality of originals is provided in a slightly left portion on the upper surface of the cover main body 121. Feeding means 123 for taking out one original after another in sequence and supplying these to one end (left end in the drawing) of the original platen 101 is provided in one end of the apparatus.

The scanner 14 includes an exposing lamp 106 as a light source, a first carriage 107 provided with a mirror 115, a second carriage 109 provided mirrors 108a and 108a each for bending an optical path, a photoelectric transducer 111 for receiving reflected lights, a driving system (not shown) for changing the positions of these elements and an A/D converter (not shown) for converting the output of the photoelectric transducer 111, i.e., image data, from analog data to digital data.

The first and second carriages 107 and 109 are coupled together by a timing belt (not shown) and the second carriage 109 is moved in the same direction as the first carriage 107 at a speed ½ of that for the latter. This enables scanning so as to make constant optical path lengths up to a lens 110. The lens 110 having a fixed focal distance is moved in an optical axis direction during variable magnification. The photoelectric transducer 111 is for photoelectrically converting a reflected light from an original into an electric signal, being constituted mainly of, for instance a CCD type line image sensor. The output of the photoelectric transducer 111 is supplied to the A/D converter.

The first and second carriages 107 and 109 and the mirrors 108a and 108b are moved by a stepping motor, not shown. These first and second carriages 107 and 108 are moved according to the movement of the timing belt, not shown, hung between a drive pulley and an idle pulley, not shown, linked to the rotary shaft of the stepping motor. The lens 10 is moved in the optical axis direction according to the movement of a spiral shaft rotated by a corresponding stepping motor, not shown.

The printer 15 is constructed by combining a laser optical system and an electrophotographic system capable of forming images on transfer paper. More particularly, the printer 15 is provided with a photosensitive drum 150 as an image carrier supported almost in the center in the apparatus so as to be freely rotated and around this photosensitive drum 150, there are disposed in order an exposure apparatus, a developing apparatus 154, a transfer charger 155, a separation charger 156, a cleaning charger 157, a discharging charger 158 and an electrofying charger 159. The photosensitive drum 150 is uniformly charged by the electrofying charger 159, the image of an original is formed on the photosensitive drum 150 by means of a laser light output from the scanner and an electrostatic latent image is formed.

The electrostatic latent image formed on the photosensitive drum 150 is developed by the developing apparatus 154 and the developed image is transferred on copying paper sheet P fed from a paper feeding cassette 130 as paper feeding means, later described, via a resist roller 120 by the transfer charger 155. The copying paper sheet P on which the image has been transferred by the transfer charger 155 is separated by means of AC corona discharging carried out by the separation charger 156, carried to fixing equipment 172 via a carrier belt and the toner developed image is melted and fixed by this fixing equipment.

Figure 2:
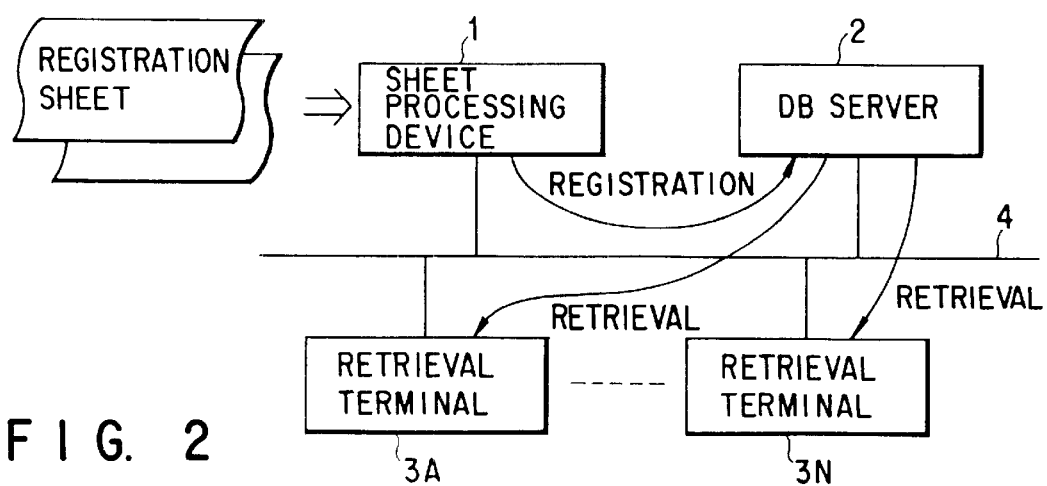
FIG. 2 is a view showing in outline the structure of a registration system containing a sheet processing apparatus.

FIG. 2 illustrates in outline the structure of a registration system containing a sheet processing apparatus as an information processing apparatus of the invention.

This system is constructed by the sheet processing apparatus 1, a DB server 2 and a plurality of retrieval terminals 3A, . . . , 3N connected to one another via, for instance LAN 4. According to this system, information may be input from the sheet processing apparatus 1, registered in the DB server 2 as information registering means and freely retrieved from the retrieval terminals 3A, . . . , 3N as information retrieving means.

Figures 3, 4:
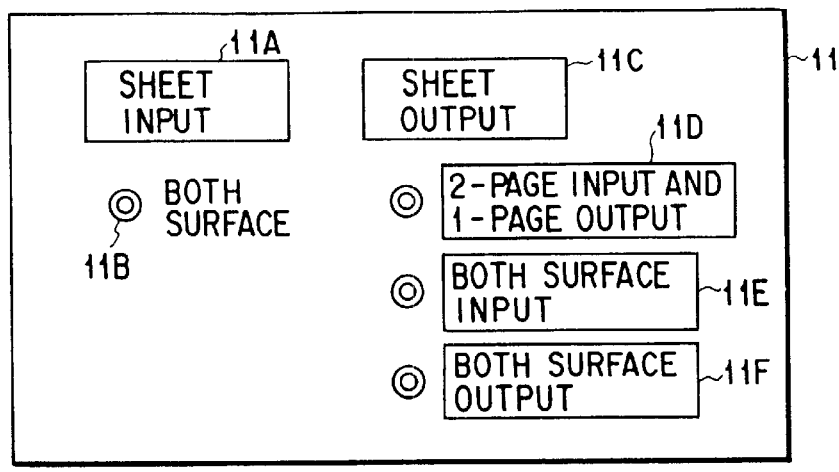
FIG. 3 is a plan view showing the structure of an operation panel in a sheet processing apparatus.
FIG. 4 is a view showing a sheet format used for registering a document.

FIG. 3 illustrates the structure of an operation panel 11 in a sheet processing apparatus. This operation panel 11, not shown, is attached to, for instance a position in the upper portion of the main body shown in FIG. 1B so as to make easy an operation by an user in front of the automatic document feeder 100.

More particularly, a "sheet input" key 11A is for reading an original sheet set in the automatic document feeder of the scanner 14, recognizing the sheet and instructing starting of processing corresponding to the sheet. In the lower portion of this key 11A, there is a key for setting a mode when a sheet is to be input. A "screen" key 11B is for setting printing on both surfaces of a sheet to be input. This key 11B is a toggle type and when pressed, this is switched ON and OFF alternatively. During ON, "○" is displayed and during OFF, "◎" is displayed.

In a both-surface mode, both surfaces of an original sheet are read. When the image of the original sheet printed on both surfaces is to be input, the "both surface" key 11B is pressed and the "sheet input" key 11A is pressed after a display is set to "○". For example, when paper with its back surface not blank is used as a sheet, the both-surface mode should be switched OFF. If this is used with the both-surface mode kept ON, an unrelated image on the back surface would be input as a sheet.

A "sheet output" key 11C is for reading an original set in the automatic document feeder of the scanner 14 and instructing starting of outputting (printing) of an unrecorded sheet of the same kind as this sheet. In the lower portion of this key 11C, there is a key for setting a mode during sheet outputting. A "2-page input and 1-page output" key 11D is for setting outputting by synthesizing one sheet of image from two sheets of images, a "both surface input" key 11E is for setting both surfaces of an original set in the automatic document feeder of the scanner 14 and a "both surface output" key 11F is for setting printing on both surfaces of paper during outputting. These keys 11D to 11F are also toggle types.

FIG. 4 illustrates a paper registration sheet S used for registration of information. "☆" is a mark representing a registration sheet and a numeral subsequent to the mark "☆" represents a sheet ID (the kind of a sheet). The sheet ID of the registration sheet S of the embodiment is "1234" and the registration sheet S shown in FIG. 4 is A4 in size and vertically long in which the short sides are set in the upper and lower portions. This is called a registration sheet of an original before being edited. A mark "☆1234" is printed in the left upper corner in FIG. 4. However, when binding or pasting is performed in the left side of this registration sheet S, this mark "☆1234" may be positioned in the center of the upper portion of the registration sheet S.

For registration of information, characters must be handwritten in frames corresponding to a "title", "a keyword", a "source" and a "date" of the registration sheet S and input from the scanner 14 in the sheet processing apparatus 1 with materials attached if necessary.

The appearance of the sheet processing apparatus 1 is the same as that of a digital copying machine or facsimile equipment and information may be registered by setting an original in the automatic document feeder of the scanner 14 and pressing a "sheet input" button (start button) on the operation panel 11. By means of such an operation, the handwritten characters in the registration sheet S are recognized, converted into text information and this text information and the attached image information are registered in the DB server 2.

For example, information may be registered in a manner described below.

Characters are handwritten in the frames of the registration sheet S like the following:

Title: World optical disk drive market

Keyword: Optical disk and CD-ROM

Source: Denpa Newspaper

Date: Aug. 2, 1995 and materials extracted from the newspaper articles are attached.

For information retrieval, the image information attached as text information may be obtained by inputting keywords from the retrieval terminal 3 and retrieving necessary information.

The DB server 2 and the retrieval terminals 3A, . . . , 3N are unrelated to the present invention and thus further description of these will be omitted.

Referring to FIGS. 5A to 5E, there are illustrated examples of registration sheets after various editing operations have been performed on the registration sheet S of an original.

Figure 5A:
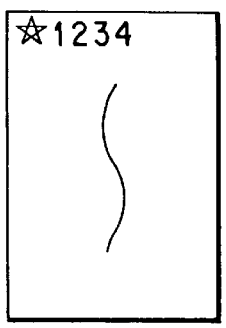
FIGS. 5A to 5E are views each showing an example of editing performed on an original sheet.
Figure 5B:
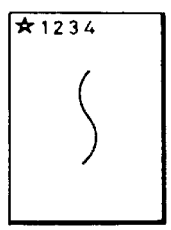
Figure 5C:
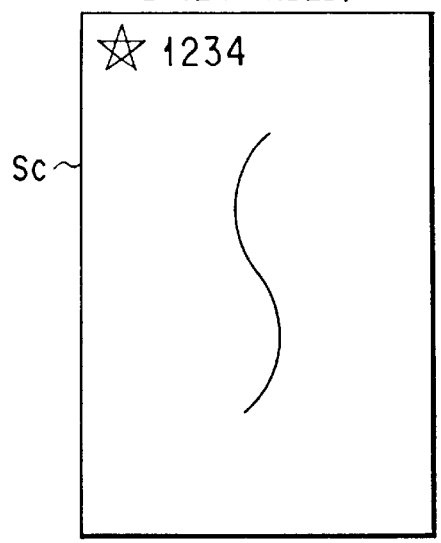
Figure 5D:
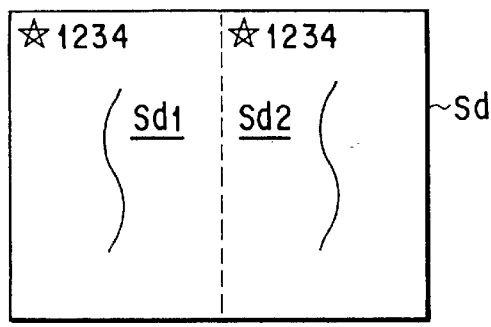

FIG. 5A shows a vertically long registration sheet of an original having a size of A4. FIG. 5B shows a registration sheet with its size reduced to A5 and FIG. 5C shows a registration sheet S with its size expanded to B4. FIG. 5D shows a registration sheet S created by synthesizing two registration sheets S into one having a size of A4 and FIG. 5E shows a registration sheet S created by synthesizing a registration sheet S and an area for attaching materials into one sheet having a size of A4.

Figure 5E:
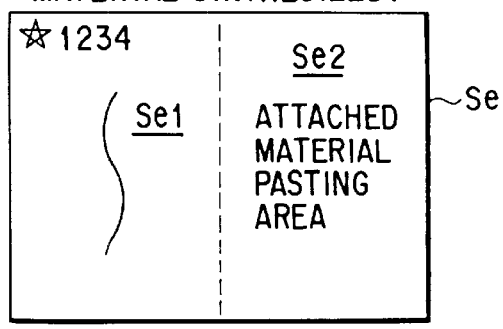

Use of the registration sheets S shown in FIGS. 5B, 5D and 5E permits saving of paper and use of the registration sheet S shown in FIG. 5C permits writing of large characters. In the conventional sheet processing apparatus, it was impossible to recognize edited registration sheets S other than that of the original shown in FIG. 5A.

Next, a main processing procedure in the sheet processing apparatus 1 having such a structure will be described by referring to FIG. 6.

CPU 10 in the sheet processing apparatus 1 is on standby for an input from the operation panel 11 (ST 1), inputs a sheet when the "sheet input" button is pressed, outputs a sheet when the "sheet output" button is pressed (ST 3) and then returns to the standby state for an input from the operation panel 11 again.

Figure 7:
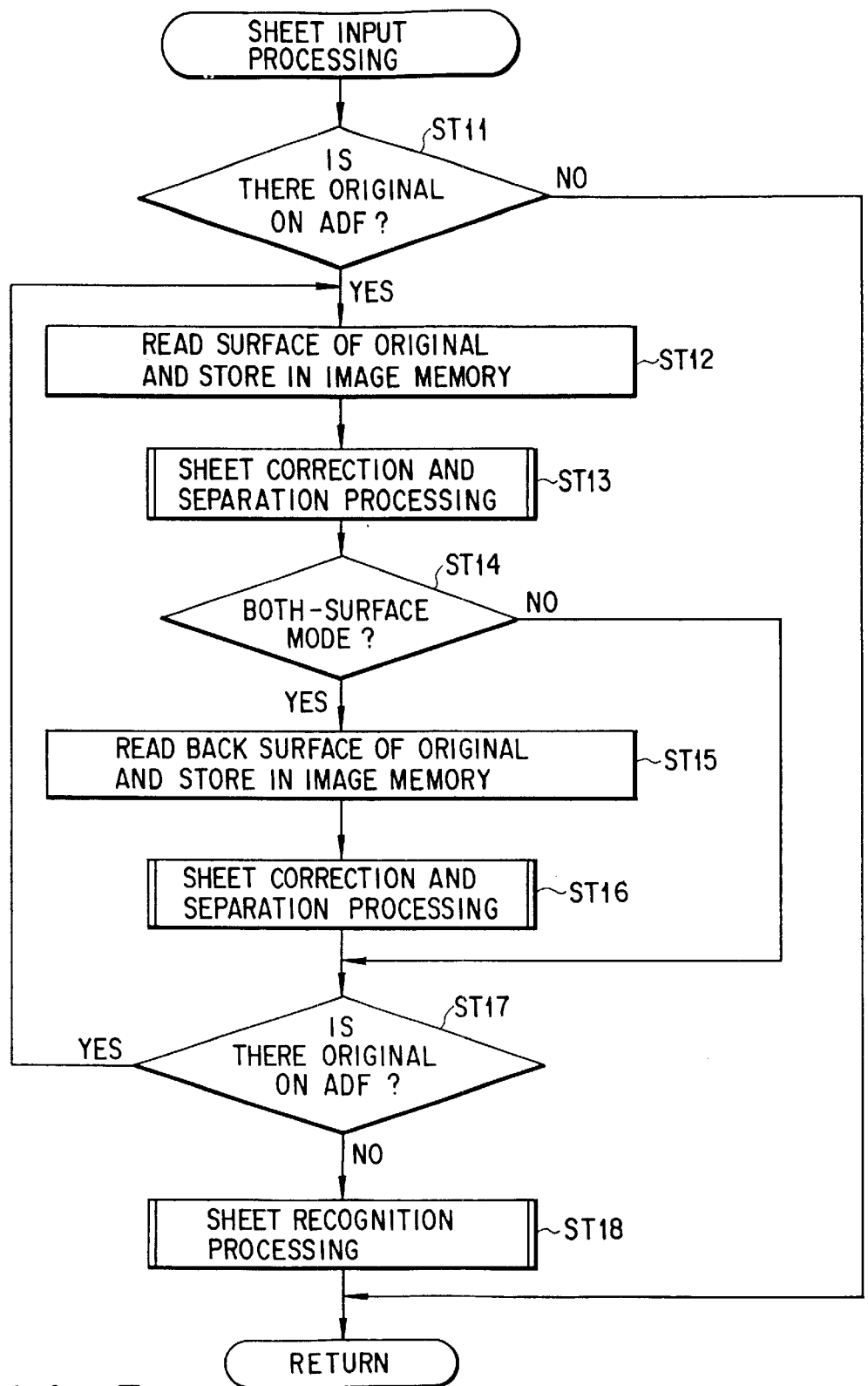
FIG. 7 is a flow chart showing sheet inputting in a sheet processing apparatus.

Next, sheet inputting in the sheet processing apparatus 1 will be described by referring to FIG. 7.

First, when the "sheet input" button of the operation panel 11 in the sheet processing apparatus 1 is pressed, CPU 10 investigates whether an original (including a registration sheet) has been set on the automatic document feeder (ADF) of the scanner 14 or not (ST 11). If it determines that the original has not been set, CPU 10 ends its operation and returns.

Upon determining that the original has been set on the automatic document feeder (ADF) of the scanner 14, CPU 10 reads the surface of the original by means of the scanner 14 and stores the read image in the image memory 16 (ST 12).

Then, by performing a sheet correction and separating operation, later described (ST 13), CPU 10 investigates whether the image of the registration sheet S stored in the image memory 16 has been edited, that 3S expanded, reduced, rotated or synthesized. When finding that this has been edited, CPU 10 executes an operation for restoring the image to that before editing. In this case, the operator may select processing of the image to restore to an original before editing by setting the size of the sheet, larger or smaller than A4, a 2-page sheet input or 1-page sheet output or the like using the operation panel 1 as setting means.

Such an operation allows storing of the same image in the image memory 16 as when the image of a nonedited registration sheet (hereinafter called sheet image) is input. For example, when the original of a registration sheet S synthesized from two sheets into one and edited is input, the image converted into an A4 size, vertically long and two-sheet image will be stored in the image memory 16.

Subsequently, CPU 10 investigates whether a mode during sheet inputting is "both-surface" or not (ST 14), reads the back surface of the original when finding that the mode is both-surface, stores this in the image memory 16 (ST 15) and performs sheet correction and separation processing as in the case of the front surface (ST 16).

Thereafter, CPU 10 investigates whether the original has been set on the automatic document feeder (ADF) of the scanner 14 or not, returns to step ST 12 for reading the original when finding that this has been set, recognizes the image stored in the image memory 16 when there are no more documents on the automatic document feeder (ADF) of the scanner 14 (ST 18) and returns after ending its processing. The difference from the conventional sheet processing apparatus is performing of sheet correction and separation processing.

Referring to FIGS. 8A to 8D, there are illustrated examples of sheet correction and separation processing performed by CPU 10 of the sheet processing apparatus 1.

Figure 8A:
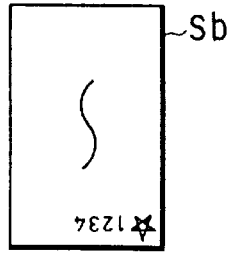
FIGS. 8A to 8D are views each showing an example of sheet separation and correction in a sheet processing apparatus.
Figure 8B:
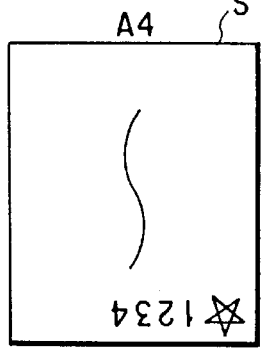

FIG. 8A shows a case where a registration sheet S reduced in size to A5 has been input upside down and stored in the image memory 16. First, as shown in FIG. 8B, CPU 10 expands the image in the image memory 16 from A5 to A4 by using the image editing section 19, converts this into an A4 size vertically long image and stores this in a memory area WM 0 in the work memory 17.

Figure 9:
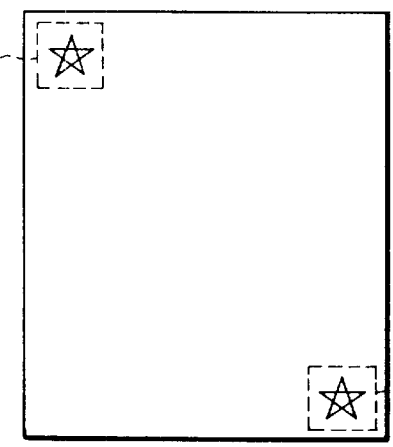
FIG. 9 is a view showing mark recognition in a registered sheet.

Subsequently, CPU 10 recognizes the position of a mark "☆" and searches for the mark "☆" in both upper left and lower right areas A and B, as shown in FIG. 9, since in the registration sheet S of the embodiment, the mark "☆" is printed in the upper left side thereof. As the mark "☆" is recognized in the lower right area in FIG. 8b, CPU 10 rotates the image in the memory area WM 0 of the work memory 17 by 180 degrees utilizing the image editing section 19 and replaces the image in the image memory 16 by this as a sheet image.

Figure 8D:
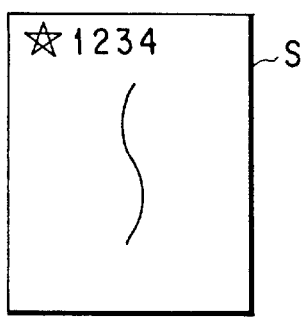
Figure 8C:
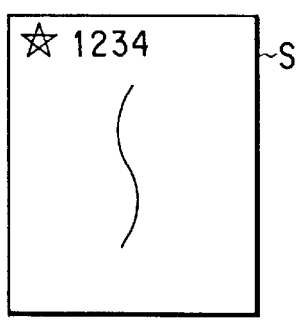

Such operations allow, as shown in FIG. 8D, changing of the A4 size vertically long registration sheet to a state of being input in a correct direction in the image memory 16.

Referring to FIGS. 10A to 10F, there are illustrated other examples of sheet correction and separation processing performed by CPU 10 of the sheet processing apparatus 1.

FIG. 10A shows a case where an A4 size registration sheet created by synthesizing a registration sheet and an attached material into one has been input and stored in the image memory 16, being long sideways. First, as shown in FIG. 10B, CPU 10 rotates the image in the image memory 16 by 90 degrees utilizing the image editing section 19 and stores this in the memory area WM 0 of the work memory 17. Subsequently, CPU 10 recognizes the mark "☆" shown in FIG. 9. Being unable to recognize the mark "☆" either in the upper left or lower right area, as shown in FIG. 10B, CPU 10 separates the image in the memory area WM 0 of the work memory 17 into an upper half A5 size image and a lower half A5 size image by using the work memory 17, performs 90-degree rotation and expansion to A4 sizes for these images and stores the images in memory areas WM 1 and WM 2 in the work memory 17, as shown in FIGS. 10C and 10D.

Then, CPU 10 performs "☆" mark recognition for the image in the memory area WM 1 in the work memory 17 and stores this as a sheet image in the image memory 16, since the mark "☆" is recognized in the upper left area as shown in FIG. 10E. CPU 10 also performs "☆" mark recognition for the image in the memory area WM 2 in the memory 17 and stores this as a non-sheet image in the image memory 16, since the mark "☆" is not recognized in either the upper left or lower right area as shown in FIG. 10F. Consequently, the image memory 16 is changed to a state where the A4 size vertically long sheet image and the non-sheet image have been stored.

Figure 11:
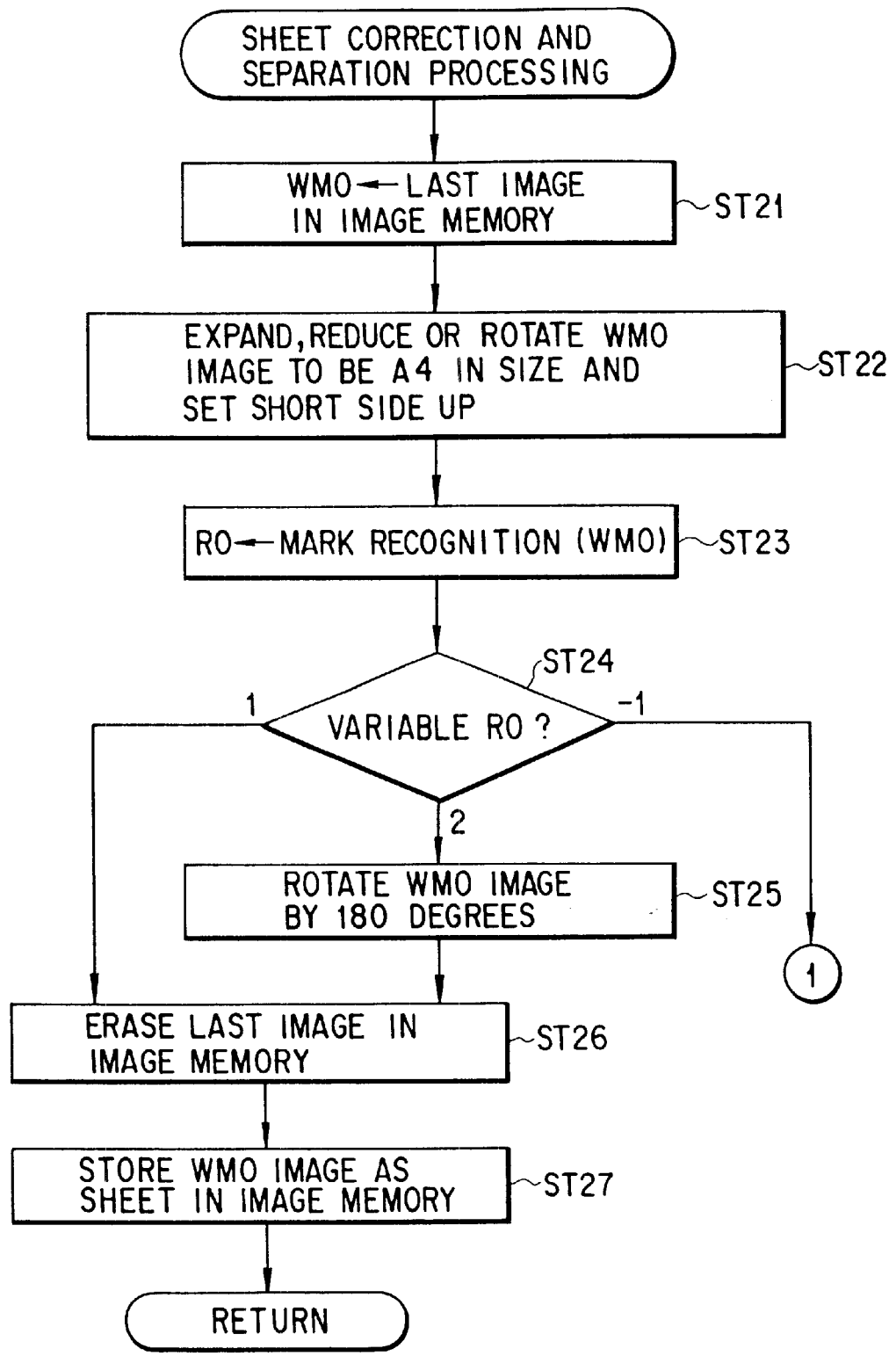
FIG. 11 is a flow chart showing sheet correction and separation.
Figure 12:
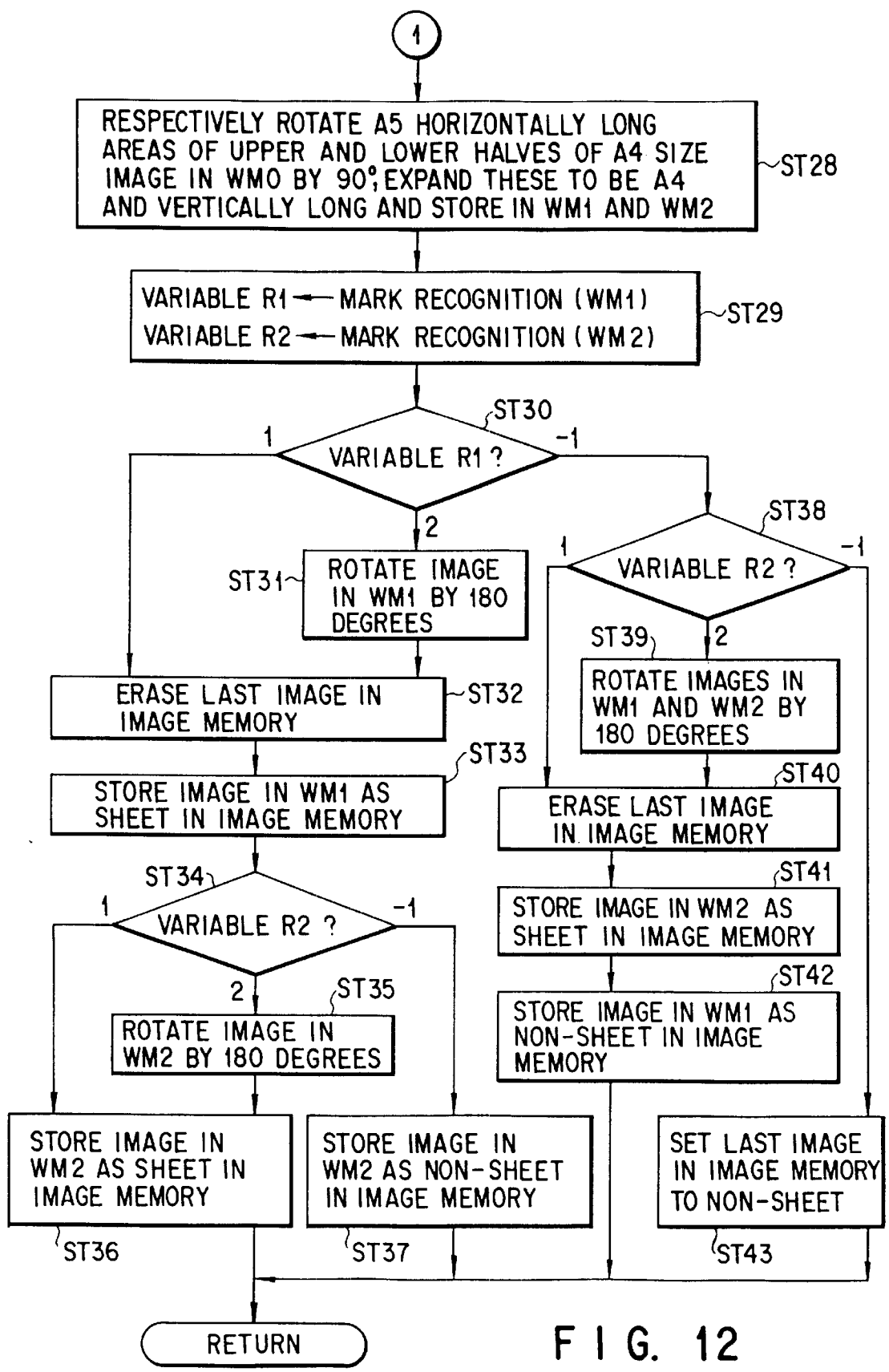
FIG. 12 is a flow chart showing sheet correction and separation.

Next, the sheet correction and separation processing shown in FIGS. 8A to 8D and 10A to 10F will be described by referring to flow charts provided in FIGS. 11 and 12.

First, CPU 10 stores the image read by the scanner 14 and stored last in the image memory 16 in the memory area WM 0 in the work memory 17 (ST 21).

CPU 10 performs image editing, such as expanding, reducing, or rotating by using the image editing section 19 such that this image may be A4 in size vertically long (ST 22). Then, CPU 10 performs "☆" mark recognition shown in FIG. 9 for the image corrected to be A4 and vertically long (ST 23) and stores the result of this recognition in a memory variable R0 in the work memory 17 (ST 24).

In step ST 24, when the value of a variable R0 is "1", it indicates recognition of the mark "☆" in the upper left area, when the value is "2", it indicates recognition of the mark "☆" in the lower right area and when the value is "−1", it indicates no recognition of the mark "☆".

CPU 10 erases the last image in the image memory 16 when the mark "☆" is recognized in the upper left area, that is, a variable R0=1 (ST 26) and stores the image in the memory area WM 0 in the work memory 17 in the image memory 16 as a sheet image (ST 27). When the mark "☆" is recognized in the lower right area, that is, a variable R0=2, CPU 10 rotates the image in the memory area WM 0 in the work memory 17 by 180 degrees utilizing the image editing section 19 (ST 25), erases the last image in the image memory 16 (ST 26) and stores the image in the memory area WM 0 in the work memory 17 in the image memory 16 as a sheet image (ST 27). When there is no "☆" mark recognized, that is, R0=−1, CPU 10 advances to processing in step ST 28 shown in FIG. 12.

In the case of a variable R0=−1, CPU 10 separates the image in the memory area in the work memory 17 into upper half and lower half A5 images by using the image editing section 19, performs 90-degree rotation and expansion to A4 sizes for these and stores these respectively in the memory areas WM 1 and WM 2 in the work memory 17 (ST 28).

Then, CPU 10 performs mark recognition for the images in the memory areas WM 1 and WM 2 in the work memory 17 and stores the recognition results as variables R1 and R2 in the work memory 17 (ST 29).

CPU 10 performs processing in step ST 30, ST 34 and ST 38 described below based on the variables RI and R2.

In step ST 30, if a variable R1=1 or 2, CPU 10 erases the last image in the image memory 16 (ST 32) and stores the image in the memory area WM 1 of the work memory 17 in the image memory 16 as a sheet image (ST 33). If the value of a variable R1 is 2, CPU 10 rotates the image in the memory area WM 1 of the work memory 17 by 180 degrees utilizing the image editing section 19 (ST 31), then erases the last image in the image memory 16 (ST 32) and stores the image in the memory area WM 1 of the work memory 17 in the image memory 16 as a sheet image (ST 33).

In step ST 34, if a variable R2=1 or 2, CPU 10 stores the image in the memory area WM 2 of the work memory 17 in the image memory 16 as a sheet image (ST 36). If the value of a variable R2 is 2, CPU 10 rotates the image in the memory area WM 2 of the work memory 17 by 180 degrees utilizing the image editing section 19 (ST 35) and stores the image in the memory area WM 2 of the work memory 17 in the image memory 16 as a sheet image (ST 36). In step ST 34, if a variable R2=−1, CPU 10 stores the image in the memory area WM 1 of the work memory 17 in the image memory as a non-sheet image (ST 37).

If a variable R1=−1 in step ST 30 and a variable R2=1 or 2 in step ST 38, CPU 10 erases the last image in the image memory 16 (ST 40), stores the image in the memory area WM 2 of the work memory 17 in the image memory 16 as a sheet image (ST 41) and stores the image in the memory area WM 1 of the work memory 17 in the image memory 16 as a non-sheet image (ST 42). If the value of a variable R2 is 2, CPU 10 rotates the images in the memory areas WM 1 and WM 2 of the work memory 17 by 180 degrees utilizing the image editing section 19 (ST 39), erases the last image in the image memory 16 (ST 40) and stores the image in the memory area WM 2 of the work memory 17 in the image memory 16 as a sheet image (ST 41) and the image in the memory area WM 1 of the work memory 17 in the image memory 16 as a non-sheet image (ST 42).

Furthermore, if a variable R1=−1 in step ST 30 and a variable R2=−1 in step ST 38, the image in the image memory 16 will be left as a non-sheet image.

Figure 13:
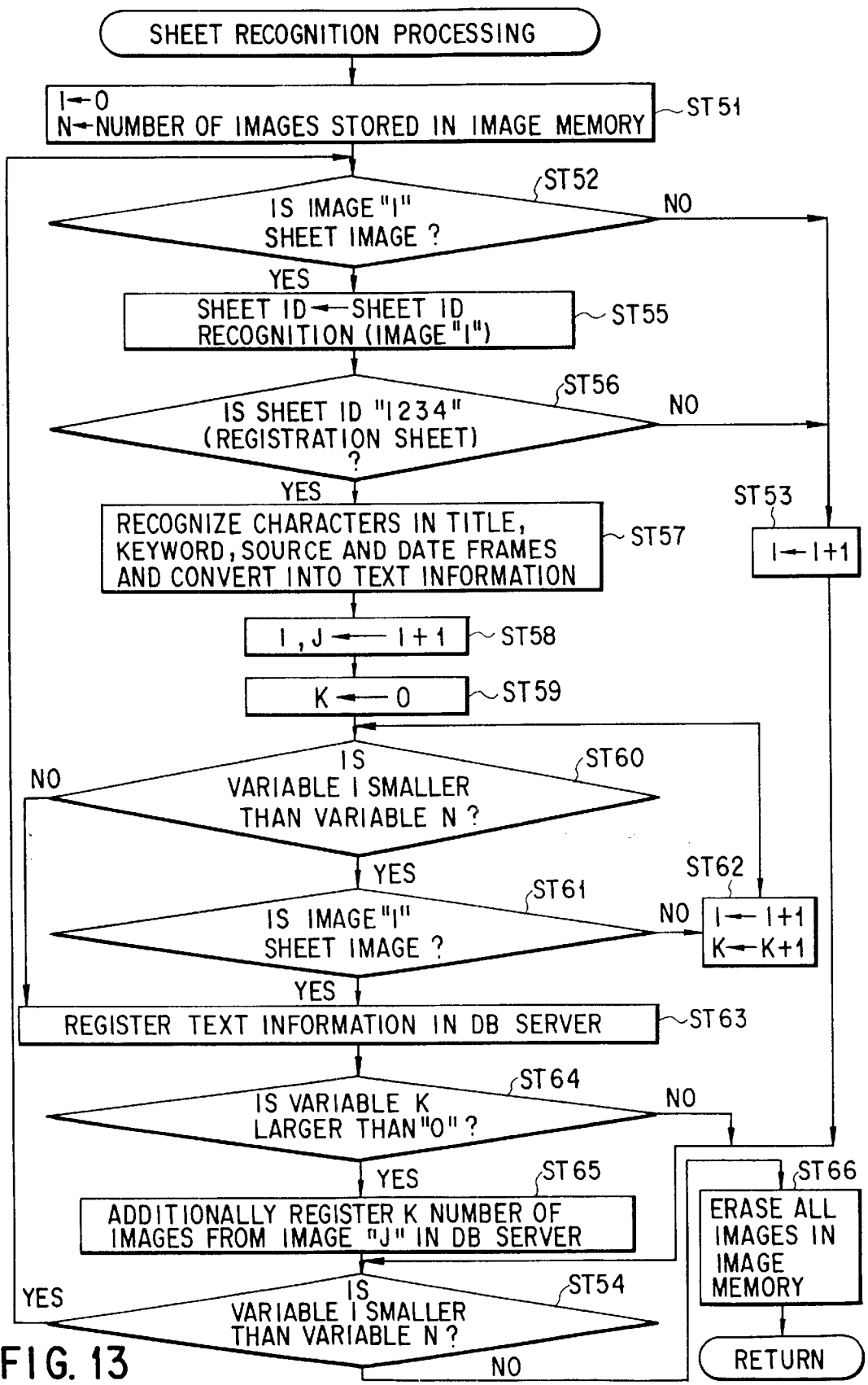
FIG. 13 is a flow chart showing sheet recognition called during inputting of a sheet.

Next, sheet recognition processing called during sheet inputting will be described by referring to a flow chart shown in FIG. 13. Herein, a sheet corrected and separated image stored in the image memory 16 is recognized and processing is performed according to the recognized sheet kind.

First, CPU 10 sets 0 to a memory variable I of the work memory 17 and stores the number of images stored in the image memory 16 in a memory variable N of the work memory 17 (ST 51). The first image in the image memory 16 is to be described as an image "I" and when the number of images is 10, it means images "0" "9".

Thereafter, CPU 10 investigates whether the image "I" has been recognized as a sheet image or not by means of sheet correction and separation processing (ST 52), increases the value of a variable I by "1" in the case of a non-sheet image and moves ahead to a next image (ST 53 and 54).

When the image "I" is recognized as a sheet image, CPU 10 recognizes a sheet ID in the right side of the mark "☆" by using the character recognizing section 18 (ST 56). When the recognized sheet ID is "1234", since this is a registration sheet, CPU 10 executes processing described below.

CPU 10 recognizes characters in the frames of a title, a keyword, a source and a date by using the character recognizing section 18 and converts these into text information (ST 57), increases a variable I by "1", uses an image at this time as an image "J" (ST 58), sets a variable K to "0" (ST 59), calculates the number of images as attached materials until the image "I" is a non-sheet image or the variable "I" is a variable N or over and stores this in the variable K (ST 60, ST61 and ST62).

Then, CPU 10 registers the recognized text information and the attached materials in the image memory 16 in the DB server 2 via LAN 4 by using the LAN control section 20 when the variable I is larger than the variable N (ST 63). Herein, if the variable K is larger than "0" (ST 64), CPU 10 additionally registers images amounting to K in number from the image "J" in the DB server 2 via LAN 4 by using the LAN control section 20 (ST 65).

When the recognized sheet ID is other than "1234", in the embodiment the variable I is only increased by 1 and this is simply ignored (ST 53).

CPU 10 repeats the above-described operation until the variable I exceeds the variable N. When this exceeds the variable N, CPU 10 erases all the images in the image memory 16 (ST 66) and returns.

Figure 14:
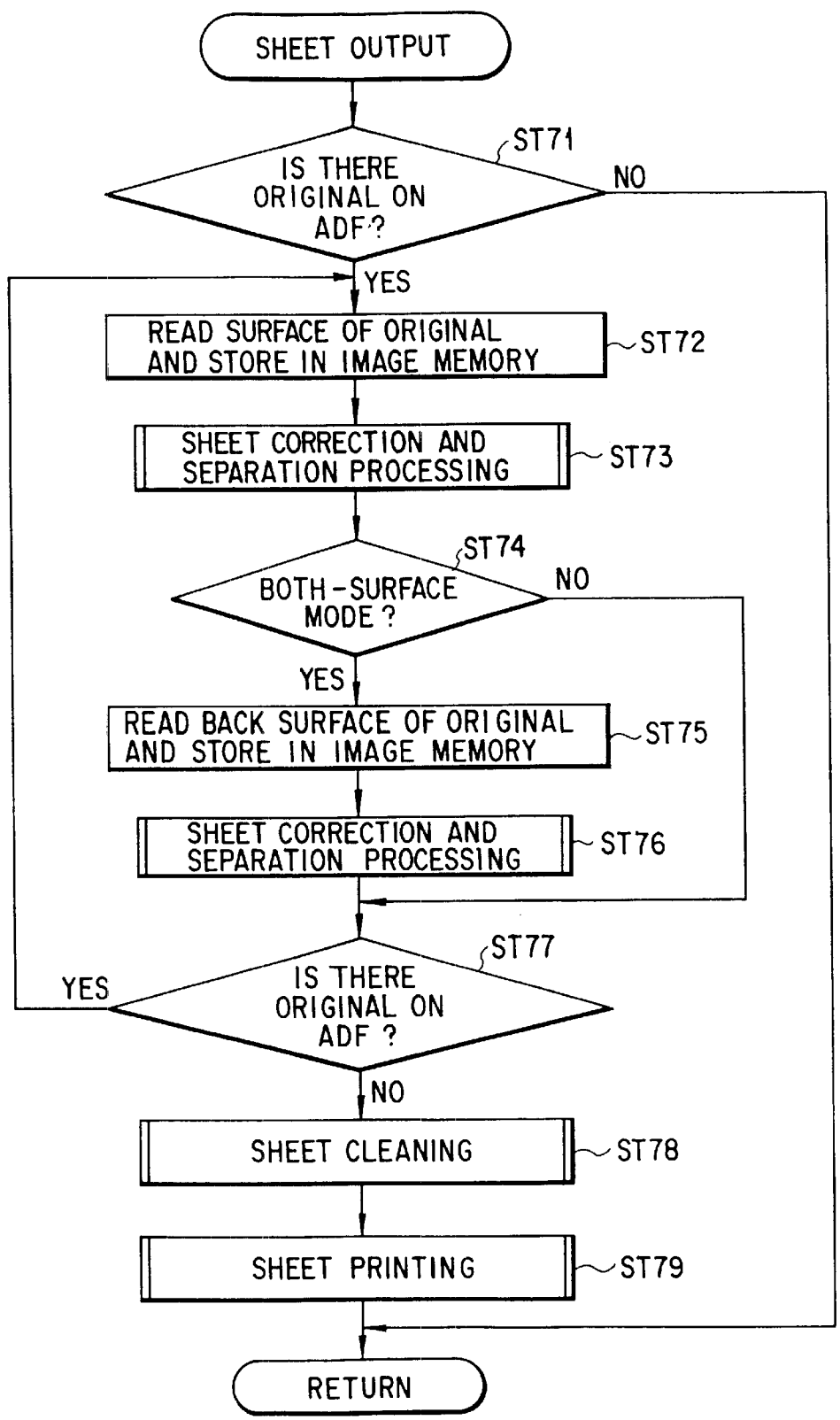
FIG. 14 is a flow chart illustrating sheet outputting.

Next, sheet output processing will be described by referring to a flow chart shown in FIG. 14. Herein, unrecorded sheets corresponding to input sheets are output (printed).

First, as in the case of the sheet input processing, CPU 10 reads an original on the automatic document feeder (ADF) of the scanner 14, stores this in the image memory 16 (ST 71 and 72) and stores a sheet image in the image memory 16 after carrying out sheet correction and separation processing (ST 73).

During this period, if a mode set by using the operation panel 11 is both-surface input (ST 74), CPU 10 reads the back surface of the original, stores this in the image memory 16 (ST 75) and stores a sheet image in the image memory 16 after carrying out sheet correction and separation processing (ST 76). CPU 10 repeats this operation until there are no more documents on the automatic document feeder (ADF) of the scanner 14 (ST 77).

CPU 10 performs sheet cleaning for erasing recorded portions in the sheet image stored in the image memory 16 (ST 78), lastly prints the sheet (ST 79) and returns.

Figure 15:
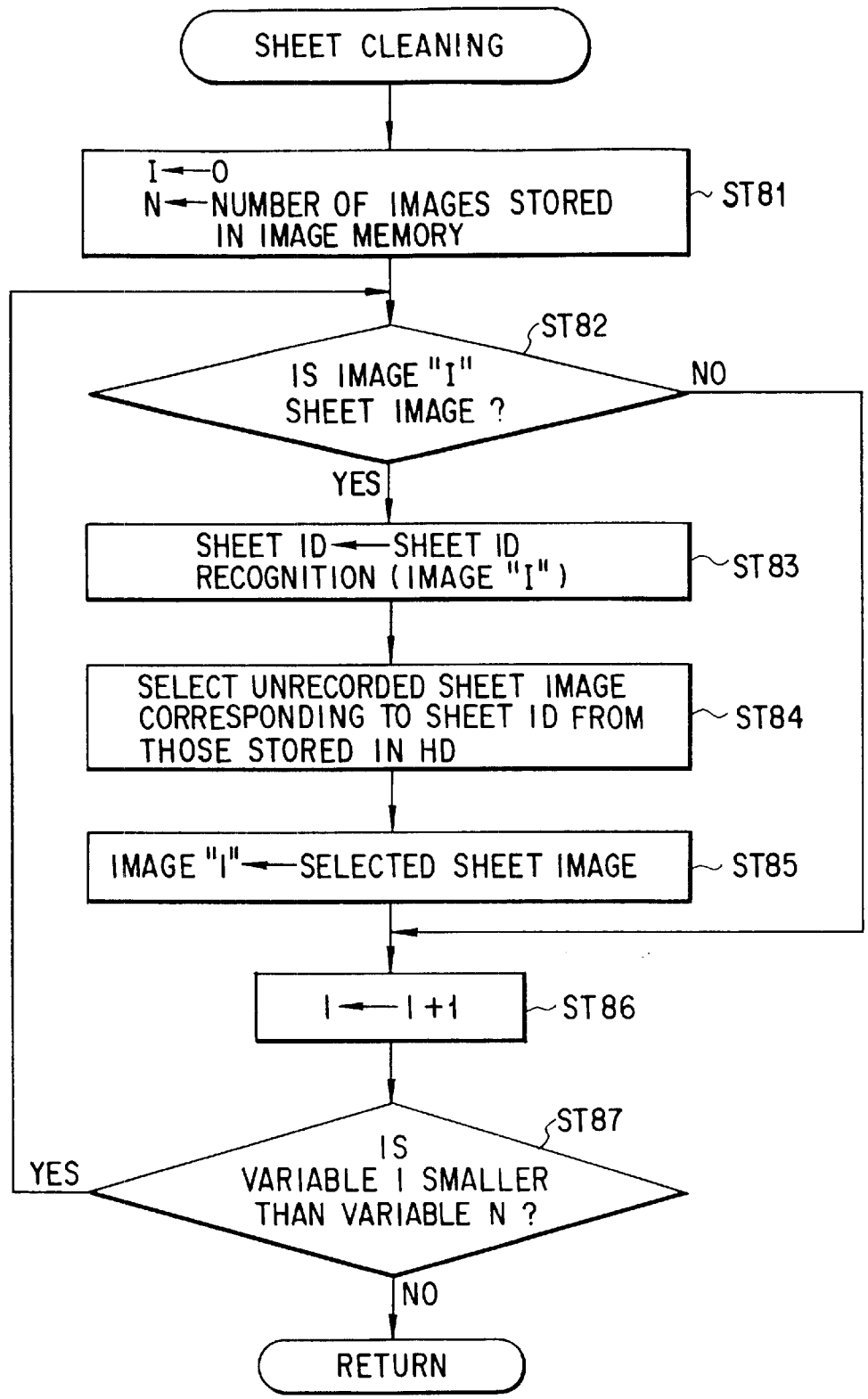
FIG. 15 is a flow chart illustrating sheet cleaning.

Next, a sheet cleaning operation will be described by referring to a flow chart shown in FIG. 15. Herein, CPU 10 recognizes the sheet ID of a sheet image stored in the image memory 16, selects an unrecorded sheet image corresponding to the sheet ID from the hard disk 13 and replaces the sheet image in the image memory 16 by this.

First, CPU 10 stores 0 for the variable I, stores the number of images stored in the image memory 16 for the variable N and determines whether the image "I" is a sheet image or not based on information set for each image during sheet correction and separation processing (ST 81 and ST82).

When determining that this is a sheet image, CPU 10 recognizes a sheet ID for the image "I" (ST 83), selects an unrecorded sheet image corresponding to the recognized sheet ID from those stored in the hard disk (HD) 13 (ST 84), stores this for the image "I" in the image memory 16 (ST 85) and advances to step ST 86. If in step ST 82 the recognition result shows that the image "I" is not a sheet image, CPU 10 moves to step ST 86 without performing any processing.

CPU 10 increases the variable I by 1, executes the above-noted processing until the variable I is smaller than the variable N (ST 87), that is, for all the images in the image memory 16, and then returns.

Next, sheet printing will be described by referring to flow charts shown in FIGS. 16 and 17. Herein, CPU 10 performs printing on paper according to setting of a mode for inputting 2 pages and outputting 1 page of an image in the image memory 16 or a both-surface output mode.

First, CPU 10 stores the number of images stored in the image memory 16 for the variable N (ST 91) and when the mode is 2-page input and 1-page output, CPU 10 performs processing described below. If otherwise, the process proceeds to step ST 102 shown in FIG. 17.

In order to synthesize two sheets of images into one in the two-page input and 1-page output mode, CPU 10 stores an A4 size blank paper image in the image memory 16 when the value of the variable N is an odd number (ST 94) and adds 1 to the variable N (ST 95). CPU 10 stores 0 for the variables I and J (ST 96), synthesizes the image "I" and an image "I+1" into an A4 size image, stores this in the memory area WM 0 of the work memory 17 (ST 97) and then stores this image for the image "I" of the image memory 16 (ST 98). CPU 10 then adds 2 to the variable I and 1 to the variable J (ST 99).

Figure 16:
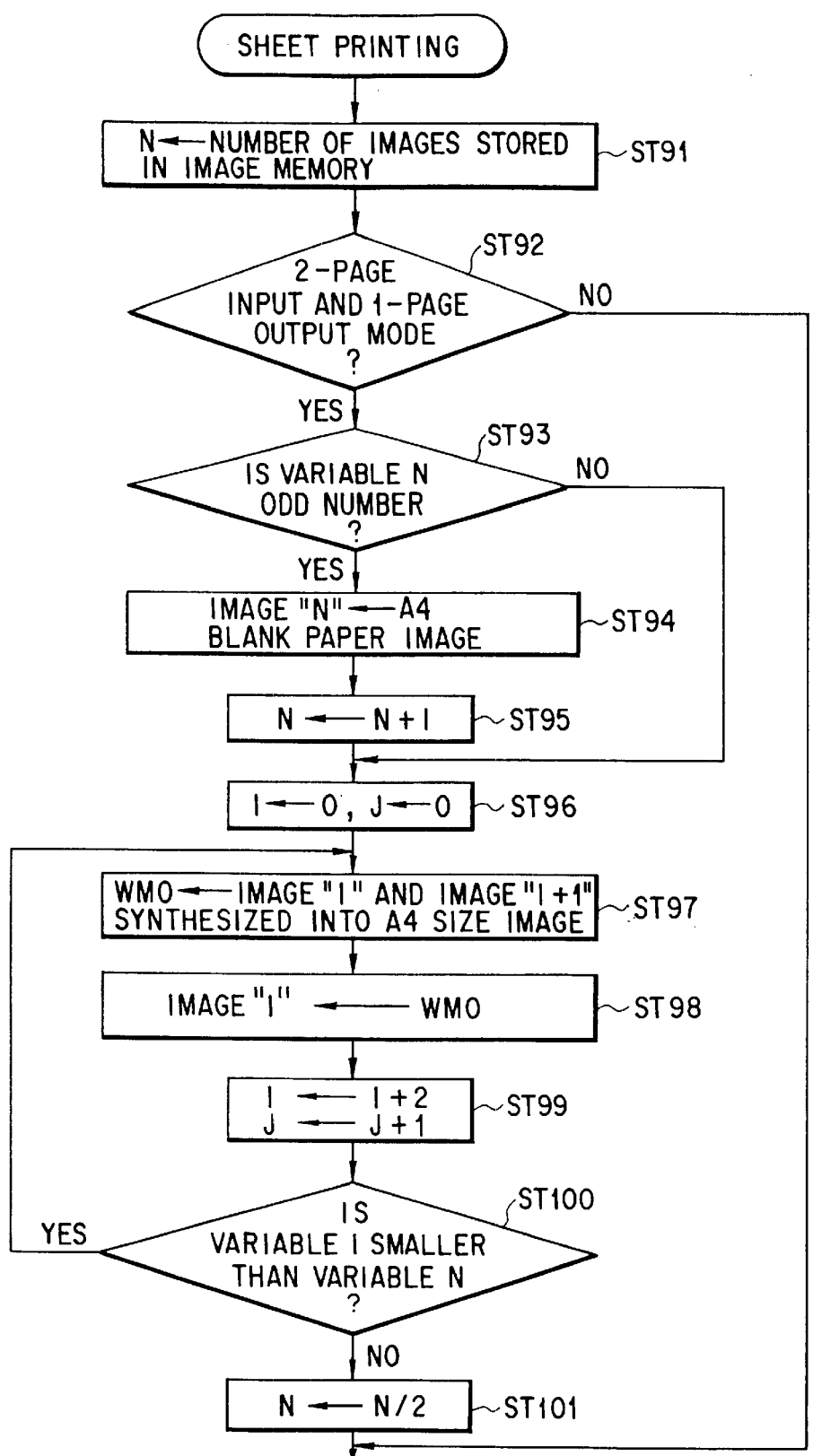
FIG. 16 is a flow chart showing sheet printing.

CPU 10 repeats this operation until the variable I exceeds the variable N (ST 100), sets the value of the variable N to half since the number of images obtained as a result of synthesizing in such a manner is half that of the original images (ST 101) and proceeds to step ST 102 shown in FIG. 16.

CPU 10 then checks to determine whether the mode is both-surface or not (ST 102) and prints the N number of images in the image memory 16 on the surface of N pieces of paper when determining that the mode is not both-surface (ST 103, 104, 105 and 106) and then returns.

When determining that the mode is both-surface mode, CPU 10 checks to see whether the variable N is an odd number or not (ST 107), stores an A4 size blank paper image in the image memory 16 if this is found to be an odd number (ST 108), adds 1 to the variable N so as to make this an even number (ST 109) and prints the N number of images on both front and back surfaces of the N/2 paper (ST 110, 111, 112 and 113) and then returns.

Apparent from the foregoing, according to the embodiment of the invention, it is possible to recognize an edited sheet by performing-sheet correction and separation on the sheet created by synthesizing two sheets into one so as to save paper, reduced, expanded or processed in other editing manners.

As for unrecorded sheets with nothing handwritten therein, inputting of used sheets by the operator to the sheet processing apparatus enables printing of unrecorded and cleans sheets therein, making it easier to obtain clean and unrecorded sheets.

Also, according to the invention, the sheet processing apparatus, the sheet processing method and the information processing apparatus capable of processing even sheets edited by means of synthesizing, expanding/reducing or rotating may be provided.

Furthermore, according to the invention, the sheet processing apparatus, the sheet processing method and the information processing apparatus capable of preventing lowering of a recognition rate by always proving high image quality, clean and unrecorded sheets may be provided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A sheet processing apparatus comprising:
    inputting means for inputting at least one of image data of an original sheet having a fixed format and edited image data of the original sheet, the edited image data including at least one of a reduced original image data, an enlarged original image data and rotated original sheet image data;
    storing means for storing the image data input by the inputting means;
    detecting means for detecting whether the edited image data is stored in said storing means;
    converting means for converting the edited image data stored in said storing means to a restored image data of the original sheet having the fixed format which has not been edited by enlarging, reducing or rotating the edited, when the detecting means detects that the edited image data is stored in said storing means; and
    recognizing means for recognizing at least one of a size and a direction of the image data of the original sheet converted by said converting means.

2. A sheet processing apparatus according to claim 1, further comprising:
    processing means for processing the image data according to at least one of a size and a direction of the image data recognized by the recognizing means,
    wherein the processing means performs at least one of enlarging, reducing and rotating the edited image data stored in the storing means.

3. A sheet processing apparatus according to claim 2, wherein said recognizing means includes means for recognizing at least one of a character, a picture, and a symbol included in said image data.

4. An information processing apparatus comprising:
    inputting means for inputting image information, the image information including original sheet image information;
    recognizing means for recognizing edited character information contained in the image information and recognizing the character which has not been edited, the edited character information including at least one of a reduced original sheet image information, an enlarged original sheet image information and rotated original sheet image information;

converting means for converting the image information inputted by the inputting means into restored image information which has not been edited when the recognizing means has recognized that the edited character information is contained in the image information, by enlarging, reducing or rotating the edited image information;

discriminating means for discriminating format information of the image information converted by the converting means; and supplying means for supplying the image information converted by the converting means to the recognizing means with the format information.

5. An information processing apparatus according to claim 4, wherein the image information includes at least information denoting one of a character, a picture, and a symbol, and the apparatus further comprising:

processing means for processing the image information inputted by the inputting means based on the character information recognized by the recognizing means, the processing means including at least one means for enlarging, reducing and rotating the edited image information, and the character information denoting one of a size and a direction the image information of the original sheet.

6. An information processing apparatus for processing image information based on a specified information processing condition, comprising:

inputting means for inputting image information, including original sheet image information;

recognizing means for recognizing edited character information from the image information inputted by the inputting means;

converting means for converting the image information inputted by the inputting means into recovered original sheet image information which has not been edited when the recognizing means has recognized that the edited character information is contained in the image information, the edited character information denoting at least one of a reduced original image information, an enlarged original image information, and rotated original image information;

supplying means for supplying the converted image information to the recognizing means; and processing means for processing the image information inputted by the inputting means based on the character information recognized from the converted image information supplied by the supplying means, the processing means including at least one means for rotating, reducing and enlarging the image information input by the inputting means, according to at least one of a size and a direction of the image information.

7. An information processing apparatus according to claim 6, wherein said the condition recognizable of the image information by the recognizing means includes a size and a direction of the image information.

8. A sheet processing apparatus comprising:

input means for inputting image data of at least one of a sheet image of an original sheet and an edited sheet image of the sheet original, the edited image data including at least one of a reduced original image data, an enlarged original image data and rotated original image data;

storing means for storing the image data input by the inputting means;

sheet image converting means for converting, when the image data is of the edited sheet image, the image data of the edited sheet image stored by the storing means to a restored image data of the sheet original, by enlarging, reducing or rotating the edited original image data;

recognizing means for recognizing at least one of a size and a direction of a character of the sheet original converted by the sheet image converting means or of the sheet image of the sheet original stored in the storing means; and processing means for processing the image data according to at least one of a size and a direction of the information given by the character recognized by the recognizing means, the processing means including at least one means for enlarging, reducing and rotating the edited image data.

9. A sheet processing apparatus according to claim 8, further comprising:

editing means for executing one of expanding, reducing and rotating and separating processes of the image of an original containing the sheet stored in the storing means and performing conversion of an image from both-surfaces image to one-surface image;

wherein said sheet correcting and separating means includes means for restoring, the sheet image edited by the editing means to an original image before editing by using the editing means.

10. A sheet processing apparatus according to claim 8, further comprising:

printing means for printing an unrecorded sheet image corresponding to the original sheet image before editing restored by the sheet correcting and separating means.

11. An information processing apparatus according to claim 6, wherein said predetermined recognizing condition includes at least image enlargement, image reduction or image rotation.

* * * * *